INVENTORS
GERLANDO MARULLO
ALESSANDRO BARONI
UMBERTO MAFFEZZONI
ERMANNO SUSA
CARLO LONGIAVE

United States Patent Office 3,502,637
Patented Mar. 24, 1970

3,502,637
HOMOGENEOUS STEREOSPECIFIC CATALYSTS AND POLYMERIZATION OF BUTADIENE THEREWITH
Gerlando Marullo, Alessandro Baroni, Umberto Maffezzoni, Ermanno Susa, and Carlo Longiave, Novara, Italy, assignors to Montecatini Edison S.p.A., Milan, Italy, a corporation of Italy
Continuation of application Ser. No. 545,167, Apr. 25, 1966, which is a continuation of application Ser. No. 791,456, Feb. 5, 1959. This application May 6, 1968, Ser. No. 727,092
Claims priority, application Italy, Apr. 24, 1958, 6,416/58
Int. Cl. C08d *1/14, 3/08;* B01j *11/84*
U.S. Cl. 260—94.3                                      14 Claims

ABSTRACT OF THE DISCLOSURE

Process for stereospecifically polymerizing butadiene whereby the catalyst system is composed of (1) a dialkyl aluminum halide and (2) a solution of a cobalt compound which is a soluble complex of a normally insoluble salt of cobalt.

---

Figure 1:
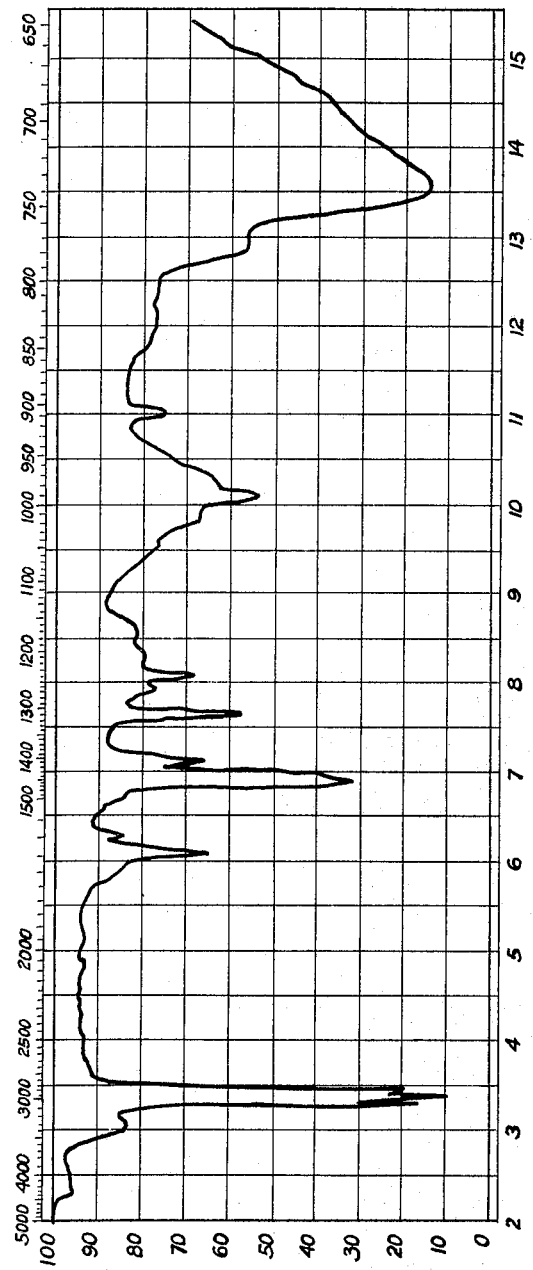

This is a continuation of Ser. No. 545,167 filed Apr. 25, 1966, now abandoned which in turn was a continuation of 791,456 filed Feb. 5, 1959, now abandoned.

This invention relates to new, improved, homogeneous stereospecific catalysts, and to a process for polymerizing diolefins containing at least one terminal double bond to high molecular weight stereoregular polymers therewith.

Stereospecific heterogeneous catalysts comprising solid compounds of metals of Groups VIII of the Mendeleeff Periodic Table and alkyl compounds of elements of Groups II and III of the Table, and the use of those catalysts in the polymerization of the diolefins, are disclosed in pending application Ser. No. 777,448. Said application discloses that, using the stereospecific heterogeneous catalysts, butadiene is polymerized to a high molecular weight polymer having substantially cis-1,4 structure. The application further discloses that the actual polymerization agent was present in the solution containing the monomer, in contact with the heterogeneous product resulting from the reaction between the solid compound of the Group VIII metal, particularly such a compound of cobalt, and the organometallic compound.

Using the stereospecific heterogeneous catalysts, it was possible to obtain good yields of the butadiene polymers having substantially cis-1,4 structure. However, relatively long polymerization times of 10 hours or more were required. Furthermore, the polymers obtained had to be subjected to careful purification to free them of catalyst residues.

One object of the present invention is to provide new stereospecific catalysts which are homogeneous and more efficient catalysts for the polymerization of the diolefins than the heterogeneous catalysts.

Another object is to provide an improved method for the stereospecific polymerization of the diolefins.

These and other objects are accomplished by the invention according to which it is found that improved, more efficient stereospecific catalysts which are homogeneous can be obtained if the Group VIII metal compound which is one component of the catalyst is complexed with organic complexing agents of various kinds, for instance with organic bases of the pyridine type.

According to one embodiment of our present invention, the stereospecific heterogeneous catalysts as disclosed in the earlier application, supra, are activated by adding, e.g., pyridine to the product obtained by mixing the Group VIII metal compound with the organometallic compound. The addition of the organic base markedly increases the activity of the heterogeneous catalysts, resulting in higher rates of polymerization of the diolefins, and in higher yields of the stereoregular polymers produced.

In fact, when the stereospecific heterogeneous catalysts are activated by adding pyridine to them, it is possible to obtain, in 30 to 60 minutes, the same yields of high polymer as are normally obtained with those catalysts only after polymerization times of 8 to 10 hours. Also, with the activated catalysts, the high polymer yields are obtained in the shorter reaction times using amounts of the Group VIII metal compounds which are remarkably smaller than the amounts normally required.

According to this embodiment of the invention, the stereospecific catalyst is prepared by introducing the desired amount of, e.g., a cobalt salt such as $CoCl_2$ and anhydrous benzene into a carefully cleaned and dried vessel provided with a stirrer and cooling means, and then adding pyridine to the mixture in an amount between 0.01 and 0.2 mol per mol of $CoCl_2$. When the pyridine is introduced, a portion of the $CoCl_2$ dissolves in the benzene as evidenced by the acquisition of a definite blue color by the latter.

The resulting mixture contains the $CoCl_2$ partially in the solid state and partially dissolved as a complex with the pyridine.

The compound of the Group II or Group III element, e.g., an organometallic compound of aluminum, is then added to the mass, followed by the diolefin which may be either in the liquid state or in the gaseous state.

Polymerization of the diolefin proceeds very rapidly and, at a temperature between 5° C. and 25° C., is completed in not more than 30 to 60 minutes.

At the end of the polymerization reaction, the viscous mass is discharged from the polymerization vessel, is precipitated and washed carefully wtih methanol, and is dried finally in an oven at 40° C. under vacuum.

Larger amounts of pyridine can be used, if desired. While the increased pyridine generally results in a reduction in the activity of the catalyst, the activity can be restored by increasing the amount of organometallic compound added subsequently to the system.

The results of a series of butadiene polymerization runs carried out with and without the addition of pyridine are given in Table I below. Table II gives the results obtained by subjecting the polymers reported in Table I to infrared examination.

The infra-red analysis was carried out on laminae of the solid polymers. Optical densities were measured by the base line method at 10.36 microns for the trans-unsaturation at 11.0 microns for the vinyl unsaturation, and at 13.60 microns for the cis-unsaturation. The coefficients of apparent molecular extinction used were 10, 6 and 12 for the trans-1,4, cis-1,4 and 1,2-bonds, respectively.

Table II also gives the values for the gel number and intrisic viscosity of the polymers of Table I. The value for the gel number was determined by placing a weighed amount of the polymer (0.1 to 0.15 g.) in a small cage (1 cm. wide) made of a steel net with 100 mesh/cm.². The cage containing the polymer was immersed in 100 cc. toluene and left to stand therein for 40 hours in the dark. After this period, the cage was withdrawn from the toluene, dried in an oven at 50° C. under vacuum, and weighed.

If P is the weight of the polymer placed in the cage, and $P_1$ is the weight of the undissolved polymer after immersion in toluene for 40 hours, then $P_1/P \times 100$ is the gel number.

The intrinsic viscosity was determined on the dissolved portion of the polymer at 26° C.

TABLE I

| Run No. | $CoCl_2$, mols | $Al(C_2H_5)_2Cl$ mols | Pyridine, mols | Al/Co, mole ratio | Pyridine/Co mole ratio | T., °C. | Time, h. | Conversion percent |
|---|---|---|---|---|---|---|---|---|
| 9 | 0.02 | 0.1 | | 5 | | 10 | 8 | 88.8 |
| 7 | 0.006 | 0.04 | | 6.3 | | 24 | 8 | 84 |
| 357 | 0.01 | 0.07 | 0.002 | 7 | 0.2 | 10 | ½ | 73 |
| 346 | 0.0025 | 0.025 | 0.0005 | 10 | 0.2 | 20 | 2 | 68 |
| 310 | 0.0025 | 0.0175 | 0.0005 | 7 | 0.2 | 20 | 2½ | 90 |
| 326 | 0.0020 | 0.014 | 0.0004 | 7 | 0.2 | 30 | 1 | 93 |

All the runs were carried out with 100 g. butadiene, in 1,000 cc. benzene.

TABLE II

| | Infrared examination | | | | |
|---|---|---|---|---|---|
| Run No. | Cis-1,4, percent | Trans-1,4, percent | 1,2 percent | Gel number | ($\mu$) at 30° C. in benzene |
| 9 | 95.5 | 2.5 | 2 | | |
| 7 | 92.8 | 3.4 | 3.8 | | |
| 357 | 95 | 2.5 | 2.5 | 0.9 | 1.51 |
| 346 | 92 | 2 | 6 | 0.8 | 1.52 |
| 310 | 95.5 | 1.9 | 2.9 | 0 | 3.75 |
| 326 | 94.1 | 3.5 | 2.4 | 1 | 5.62 |

According to another embodiment of our invention, the solution of the complex of the Group VIII metal salt with the pyridine or the like, in the benzene or other inert hydrocarbon solvent, is separated from the solid metal salt and undissolved complex, and is mixed with the organometallic compound of the Group II or Group III element to obtain a stereospecific catalyst which is homogeneous.

In the last-mentioned embodiment, only that portion of the cobalt or other Group VIII metal salt which is complexed with the pyridine and dissolved in the solvent is used in preparing the catalyst.

Surprisingly, the homogeneous catalysts are exceptionally active in the polymerization of butadiene and make it possible to obtain polymers having reliably reproducible characteristics. These desirable and important results are obtained with extremely small amounts of the Group VIII metal salt, particularly in the case of cobalt salts.

Using the soluble, homogeneous catalysts, we obtain, with very high polymerization rates, very high polymer yields. When a cobalt salt, such as cobaltous chloride, is used in preparing the catalyst, the polymer yields obtained are as high as 100 kg. of polymer per 5 g. of the cobalt salt used.

In addition to the direct advantage of reducing the consumption of VIII group metal compound to a minimum, the catalysts and method of the present invention have other noteworthy advantages. Thus, the polymerization can be carried out continuously very readily. Also, due to the extremely small amounts of metal compounds present in the polymers, the purification thereof is greatly simplified.

An additional advantage is that the characteristics of the polymers obtained from run to run are more constant, including their structure, molecular weight and solubility in hydrocarbons.

The soluble, homogeneous stereospecific catalysts can be prepared, for example, as follows: 2 g. anhydrous $CoCl_2$ are suspended in 1000 cc. of benzene and placed in a flask provided with a stirrer; 1.23 cc. pyridine are added, and the mixture is stirred for 30 minutes.

The benzene acquires a deep blue color, while a solid residue consisting of unchanged $CoCl_2$ and the undissolved portion of the $CoCl_2$-pyridine complex (which is only partially soluble in benzene), remains at the bottom of the flask.

The solid portion is separated from the clear blue benzene solution by filtration. Analysis of the blue solution shows that it contains 0.1 g./liter of dissolved $CoCl_2$.

50 cc. of the blue benzene solution of the $CoCl_2$-pyridine complex (containing 0.0000375 mol $CoCl_2$) are diluted with 450 cc. of benzene and added to a solution of 0.0172 mol of $Al(C_2H_5)_2Cl$ in 500 cc. benzene.

The solution thus obtained can be used as catalyst for the polymerization of the diolefins containing at least one terminal double bond, and particularly of butadiene, at room temperature or at temperatures somewhat higher than room temperature.

Table III gives the results obtained by polymerizing butadiene with the catalytic solutions. The results show that the solutions are highly active, extremely small amounts thereof are effective, and the characteristics of the polymers produced from run to run are substantially constant.

The polymers were separated from the viscous mass contained in the autoclave at the end of the polymerization by simple precipitation with methanol, followed by drying in an oven at 40° C. under vacuum.

TABLE III

| Runs No. | $CoCl_2$, millimols | $Al(C_2H_5)Cl$ millimols | Polymerizat. time, minutes | Conversion, percent | Infrared examination | | |
|---|---|---|---|---|---|---|---|
| | | | | | Cis-1,4, percent | Trans 1,4, percent | 1,2, percent |
| 404 | 0.375 | 16.9 | 30 | 80 | 94.2 | 2.8 | 3 |
| 405 | 0.375 | 37.5 | 60 | 92 | 94 | 3 | 3 |
| 405$_1$ | 0.375 | 37.5 | 60 | 90 | 94.7 | 1.9 | 3.4 |
| 405$_2$ | 0.375 | 37.5 | 60 | 91 | 94 | 3 | 3 |
| 405$_3$ | 0.375 | 37.5 | 60 | 93 | 95.1 | 2.3 | 2.6 |
| 405$_4$ | 0.375 | 18.7 | 60 | 89 | 95.8 | 2.1 | 2.1 |

All the runs were carried out with 100 g. butadiene, in 1,000 cc. benzene, at 15° C.

The amounts of reactants are illustrative and can be varied over a wide range.

The molar ratio of VIII group metal salt to nitrogen base used in preparing the solution can vary. For example, when cobaltous chloride and pyridine are used, the molar ratio may be from 1:1 to 1:3.

Similar variations can be made when other VIII group metal salts are used, such as sulfates, bromides, iodides, acetates, etc. with other organic bases, such as nuclearly substituted, e.g., alkylated pyridines, quinolines, etc.

The concentration of the VIII group metal salt in the final catalytic solution can be as low as hundredths of a millimole per liter without remarkably decreasing the catalytic activity of the solution.

According to a further embodiment of the invention, the homogeneous stereospecific catalysts are obtained by (1) starting with certain compounds of the Group VIII metals, particularly cobalt and nickel compounds, which have a definite, even if limited, solubility in certain solvents which can be used in polymerization processes involving the presence of organometallic compounds, or which can be rendered soluble by the formation of complexes different from the complexes with pyridine, etc. described above, and (2) mixing the Group VIII metal compound or complex with the organometallic compound such as an alkyl aluminum compound.

The solvents which can be used with said catalysts are those which do not react with the organometallic compounds, are liquid under the conditions of use and belong to the following classes:

Cycloaliphatic hydrocarbons such as cyclohexane and its homologues, aromatic liquid hydrocarbons, such as benzene, toluene and xylene, hydro-aromatic liquid hydrocarbons, for example, tetrahydro-naphthalene and phenylcyclohexane, and chlorinated aromatic hydrocarbons, such as, for instance, chlorobenzene.

Mixtures of the solvents listed can obviously be used, as well as mixtures of said solvents with other solvents, such as aliphatic hydrocarbons, which are solvents for the starting VIII group metal compounds and are, however, poor solvents for the catalyst, provided that the resulting mixture is a solvent for the resulting catalyst.

The amount of aliphatic hydrocarbon which may be present in the mixture depends substantially on the nature of the starting VIII group metal compound. The presence, e.g. of organic groups bound to the starting metal compound allows of the use of larger amounts of aliphatic hydrocarbons in the solvent mixture.

Compounds of the Group VIII metals which can be used in preparing the catalysts according to the last-mentioned embodiment of the invention, and which are soluble in solvents of the kind mentioned, include the acetylacetonate, alkyl dithiocarbamates, xanthogenates, and carbonyls. The catalyst can be prepared by mixing the solution of such Group VIII metal compounds with a solution of the organometallic compound in a similar solvent, the solvent in both cases being chemically inert to the organometallic compounds.

Compounds of the Group VIII metals which are not soluble in the solvents mentioned, even to a slight extent, but which are very soluble in polar solvents not generally chemically inert to the organometallic compounds, can be used in preparing catalysts according to this invention in some cases. Thus, such a Group VIII metal compound can be dissolved in the minimum amount of the polar solvent, and a dilute solution of the organometallic compound in an inert solvent can be added, an increased amount of the organometallic compound being used in order to replace the portion thereof which is consumed by reaction with the polar solvent.

It is thus possible, in preparing the catalysts, to start with a large number of different compounds of the Group VIII metal, particularly of nickel and cobalt, which tend to form compounds or complexes that are soluble in various solvents.

Starting with cobalt or nickel salts, it is possible to obtain soluble complexes not only with organic bases of the type of pyridine and substituted pyridines, but also with nitrogen-containing compounds generally, such as the various aliphatic primary, secondary and tertiary amines, diamines, amides such as acetamide and dimethylformamide, aniline and other aromatic amines, phenylhydrazines, alkoximes, and ketoximes, as well as compounds of the type of pyrrole, morpholine, etc.

Soluble complexes with still other compounds can be obtained, particularly in the case of cobalt. For instance, useful soluble complexes can be obtained by associating cobalt salts with alcohols, ketones, nitriles, or with organic compounds containing elements of Group V–B of the Mendeleeff Periodic Table, such as phosphines, arsines, stibines, and alkyl- and arylalkyl-phosphates and phosphites.

The compounds mentioned are illustrative and representative of those which form soluble complexes with the cobalt salts that are useful in preparing the catalysts. In practice, any compound of the Group VIII metals which can be brought into solution can be used as starting component for the preparation of catalysts according to the invention.

In general, the catalysts thus obtained are very active in the polymerization of diolefins even when used in low concentrations. It is possible to employ satisfactorily catalyst amounts in the range of fractions of 1.0 mg./g. of polymer produced.

Operating with these homogeneous catalysts it is possible, generally, to obtain diolefin polymers having a highly regular structure. More particularly, with butadiene, it is possible to obtain polymers having a content of cis 1,4 enchained monomeric units which is higher than 90%, and in many cases as high as 97–98%.

Moreover, we find, as an additional feature of our invention, that by operating under suitable conditions with these soluble catalysts and especially those obtained from cobalt compounds, it is possible to regulate the degree of polymerization of the polymer as desired within certain limits, and to restrict the molecular weight distribution in the polymer within a very small range, so that the polymers have a high degree of uniformity.

We have found that when the present catalysts are used, the degree of polymerization of the polymer produced is closely connected with the concentration of the Group VIII metal compound and with the concentration of polymer in the system.

Therefore, by regulating the concentration of either the metal compound, or of the polymer formed in the polymerization solution, it is possible, in practice, to vary the molecular weight of the polymer within a range of values which is of practical importance in the use of the polymers, and which is, e.g., between 100,000 and 1,000,000. Wider variations in the molecular weight of the polymers are possible if desired.

The dependence of the polymerization process on the concentration of the Group VIII metal compound and on the polymer obtained demonstrates that the present catalyst acts with a mechanism which is different from that of the usual catalyst prepared from transition metal compounds and organometallic compounds.

The different mechanism is also evidenced by the homogeneity of the polymers obtained, and which can be illustrated, e.g. in the case of the butadiene polymers, by fractionated precipitation of the polymer with a non-solvent. Thus, starting with a benzene solution of the polybutadiene, and adding to such solution successive amounts of methanol such that precise benzene-methanol ratios are attained, fractions having a molecular weight comprised in a narrow range are obtained. By this method, it has been established that more than 80% of the total butadiene polymer obtained with the homogeneous catalysts has a degree of polymerization comprised within a very narrow range.

These polymers we obtain are of the type known as "living polymers" (see, e.g., Szwarc, Nature 178 No. 4543, 1168/1956).

As noted above, the catalysts can be prepared by simple processes.

When a soluble complex of a salt of Group VIII metal is desired, it can be obtained very readily by suspending the salt in the selected solvent also containing the complex-forming agent, and agitating the mass until the complex is formed in the desired concentration. The solution is then mixed with the solution of the organometallic compound to obtain the final catalytic solution and the latter can be used direcly in the polymerization.

When the compound of the Group VIII metal is directly soluble in the polymerization solvent, the procedure is simpler since it is sufficient to mix the solutions of both components at the time they are used.

The organometallic compound mixed with the Group VIII metal compound or complex is preferably an aluminum compound, in particular an alkyl aluminum halide, e.g., an alkyl aluminum chloride or bromide in which the alkyl groups contain from 1 to 5 carbon atoms.

Alkyl derivatives of other elements, particularly of beryllium, zinc and boron, can also be used.

The amount of organometallic compound to be used in relation to the amount of cobalt compound is not critical as it does not exert any particular influence on the activity of the catalyst or on the characteristics of the obtained polymers. Using very pure solvents, in the absence of impurities which would react with the organometallic compounds, it is possible to operate with a very low concentration of organometallic compound in the catalytic solution. Such concentration may be of the order of a few millimoles per liter.

In practice, it is not particularly advantageous to use concentrations of the organometallic compound lower than 10 to 20 millimoles/liter.

The diolefins which can be polymerized with the present catalysts include, in addition to butadiene, isoprene, pentadiene-1,3 and other diolefins containing at least one vinyl double bond and whether conjugated or not.

The polymers of the conjugated diolefins obtained by the present method have substantially 1,4-enchainment of the monomeric units and contain only a low proportion of vinyl groups. In general, the cis-structure prevails, as observed in the case of butadiene.

The homogeneous catalysts of the invention exhibit stereospecificity even when the monomer feed contains, in addition to the diolefin, other unsaturated and/or saturated hydrocarbons. As shown in examples given below, even with the mixed monomer feeds, the butadiene polymerizates obtained show consistently a substantially cis-1,4 structure. This is surprising, particularly since very pure butadiene had to be employed in order to obtain stereoregular polymers using the heterogeneous catalysts disclosed earlier.

When the present homogeneous stereospecific catalysts are used in the polymerization of butadiene, it is not necessary to use the monomer in the pure state. Mixtures of butadiene with isobutene and/or with variable amounts of butene-1, and even gases containing relatively low percentages of butadiene, such as, e.g., $C_4$ fractions of refinery cracking streams, can be used successfully to obtain good yields of substantially cis-1,4 polybutadiene.

This is a significant technological advantage, since it is known that the separation of pure butadiene from such fractions is complicated and costly. Using these catalysts and the present polymerization process, none of the components of the $C_4$-fraction disturbs the polymerization of the butadiene contained therein, except for incidental substances which may be present, such as water, sulfur-compounds, etc. which tend to react with the catalysts.

The presence of acetylene hydrocarbons in the feed can exert a negative influence on the polymerization rate, and should preferably be avoided or reduced.

In all instances, the butadiene polymers we obtain using the present improved homogeneous stereospecific catalysts have the typical structure of the butadiene polymers disclosed in the pending application (supra) and which was established by infra-red and X-ray examinations, and by crystallization studies. That is, the polymers are characterized by being formed of macromolecules showing for substantially their entire length, the cis-1,4 structure, and by a substantial absence of copolymer macromolecules comprising different types of structure in the same macromolecule. These polymers have particular utility in the preparation of elastic rubbers having valuable mechanical characteristics.

The following examples are given to illustrate the preparation of the homogeneous catalysts, the use thereof in the polymerization of butadiene, and the characteristics of the polymers produced. It is to be understood that the examples are not intended as limiting.

EXAMPLE 1

In a flask provided with stirrer, 2 g. anhydrous $CoCl_2$ are contacted with 1000 cc. anhydrous benzene containing 1.2 g. pyridine. The mixture is stirred for about 2 hours and the blue solution thus obtained is filtered. This operation can be carried out in the presence of air.

The solution has a $CoCl_2$ content of 0.089 g./l.

Into a second flask, provided with stirrer and from which air has been eliminated by flushing with nitrogen, 765 cc. anhydrous benzene, containing 2 g. diethyl aluminum chloride are introduced, and 235 cc. (0.0208 g. $CoCl_2$) of the blue solution prepared separately, are gradually added.

A perfectly clear yellow solution is obtained, which is introduced into a 2 liter stainless steel autoclave provided with a stirrer and a cooling jacket, from which air has previously been displaced by nitrogen.

100 g. butadiene are then introduced into the autoclave, the flow rate being regulated to avoid an increase in the temperature which is kept at between 10° C. and 15° C. by circulating a cooling medium in the jacket.

The reaction is allowed to proceed until the constant pressure indicates that practically all the monomer has been converted.

The reaction product is a homogeneous clear and highly viscous solution.

The polymer is separated from the solvent by treatment with methanol, which transforms it into a white rubbery mass. The last portions of solvent and methanol are eliminated by placing the mass in an oven at 50° C. under vacuum.

From the infra-red spectra of the polymers thus obtained, a content of cis-1,4 enchained polymer of between 94.5% and 97.9% can be determined.

The infra-red spectra were taken on samples of solid polymer obtained by evaporation of the solvent, or on samples of polymer emulsified with $CS_2$, and enclosed between two sodium chloride laminae.

The optical densities were measured by the base line method at 10.36 microns for the trans unsaturation, at 11.0 microns for the vinyl group and at 13.60 microns for the cis unsaturation.

The following coefficients of apparent molecular extinction were used: 10 for the trans-1,4 bond, 6 for the cis-1,4 bond and 12 for the 1,2 bond.

Figure 2:
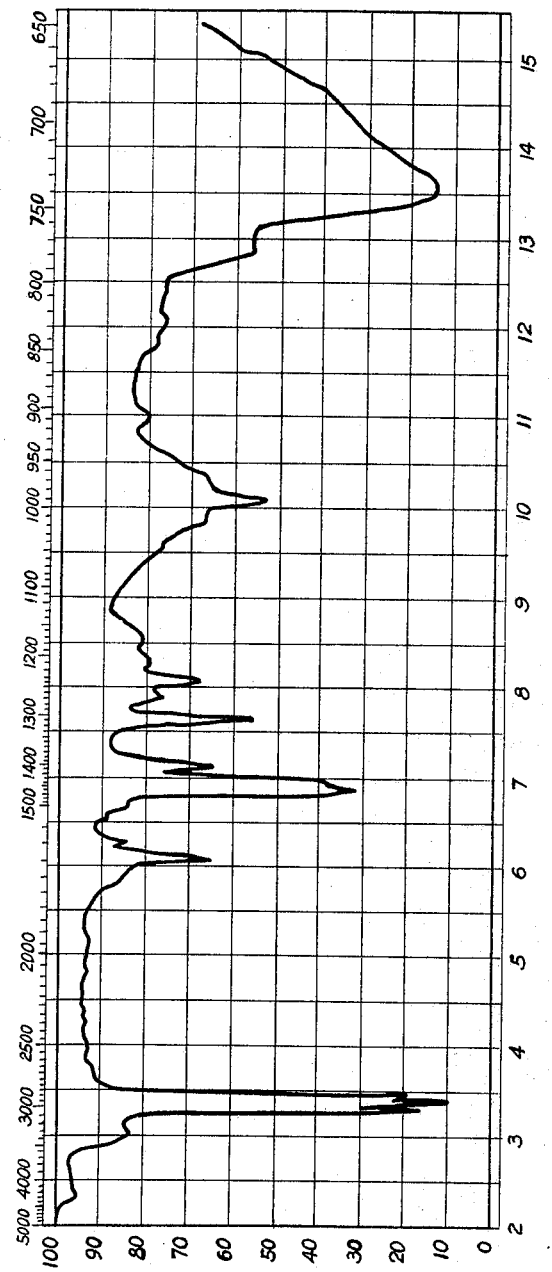

FIGURES 1 and 2 of the accompanying drawings are infra-red diagrams which are characteristic of a polymer obtained by the present process. In said diagrams, the wavelengths in microns are reported at the bottom, the frequencies in cm.$^{-1}$ at the top, and the percent transmission on the ordinates.

The polymer shows, according to the mentioned calculation method, 97.2% of cis-1,4 structure, 1.4% of trans-1,4 structure and 1.4% of 1,2 structure.

Two series of polymerization runs were carried out. In the first series, the amount of monomer was varied between 22 g. and 117 g. while keeping other conditions constant. Polymers were thus obtained in which the molecular weight was increased by increasing the polymer concentration.

The following table reports the results obtained:

|  | Grams | | | | | |
| --- | --- | --- | --- | --- | --- | --- |
| Butadiene | 22 | 30 | 41.5 | 51.5 | 55 | 117 |
| Intrinsic viscosity | 1.55 | 1.80 | 2.20 | 2.40 | 2.35 | 4.08 |
| Molecular weight | 108,000 | 125,000 | 160,000 | 180,000 | 192,000 | 342,000 |

In the second series of runs the amount of $CoCl_2$ was varied while keeping the amount of monomer constant at 145 g., and, therefore (operating so as to obtain total conversion) keeping the amount of polymer constant. In this series of runs, molecular weights were obtained which increased by decreasing the amount of $CoCl_2$, as shown in the following table:

| $CoCl_2$ | Mg. | | | | |
|---|---|---|---|---|---|
| | 40 | 30 | 20 | 16 | 12 |
| Intrinsic viscosity | 2.00 | 3.15 | 5.05 | 6.00 | 7.32 |
| Molecular weight | 140,000 | 255,000 | 455,000 | 560,000 | 720,000 |

To determine the molecular weight, the polymer is dissolved in toluene (48 hours of contact time) and the gel portion (if any and in general less than 1%) is separated by filtration on a net with 6000 mesh/cm.[2].

On the dissolved portion, the intrinsic viscosity is determined at 26° C. From this value, the molecular weight is calculated according to the formula of Johnson and Wolfangel [Ind. Eng. Chem. 44, 752 (1952)].

$$[\mu] = 1.53 \times 10^{-4} \times M^{0.80}$$

100 parts of the polybutadiene obtained according to the method described and having the following characteristics:

Molecular weight—860,000
Gel percent—8.2
Infra-red spectra:
  Cis-1,4 structure—96.3%
  Trans-1,4 structure—1.3%
  1,2 structure—2.4% are mixed in a two-roll mill with the following ingredients:

| | Parts |
|---|---|
| Phenyl-β-naphthylamine | 1 |
| Stearic acid | 2 |
| Zinc oxide | 3 |
| "Santocure"[1] | 1 |
| Sulfur | 0.8 |

[1] Condensate of mercaptothiobenzole with cyclohexylamine.

and the mix is vulcanized at 160° C. for 25 minutes.

The vulcanized product has the following characteristics:

Tensile strength [1]—205 kg./cm.[2]
Elongation at break—800%
Modulus at 300% elongation—20 kg./cm.[2]

[1] According to ASTM 412-49 Specimen B, with rate of separation of the grips of 500 mm./minute.

EXAMPLE 2

Into a carefully cleaned, dried and evacuated 3000 cc. autoclave, provided with agitator and with a jacket for circulation of the cooling liquid, 6 g. (0.05 mol) diethyl aluminum monochloride, 985 cc. chlorobenzene and, successively, 15 cc. of a solution of cobalt chloride-pyridine complex in chlorobenzene (with a concentration of 0.606 g./l. $CoCl_2$) are introduced. Immediately thereafter, 100 g. 98.5% butadiene are charged.

After agitation for 5 hours, regulating the inside temperature at 15° C., the autoclave is opened and a highly viscous mass of polybutadiene is withdrawn. The polymer is precipitated and washed with methanol and finally dried in an oven at 40° C. under vacuum.

79 g. of a white elastic polymer having the following characteristics are obtained:

| Infra-red examination: | Percent |
|---|---|
| Cis-1,4 structure | 93.7 |
| Trans-1,4 structure | 3.0 |
| 1,2 structure | 3.3 |

The intrinsic viscosity of the polymer, determined in toluene at 26°, is 4.97.

EXAMPLE 3

The process is carried out as described in Example 1, except that methylethylpyridine is used instead of pyridine. Also in this case, by using 2 anhydrous $CoCl_2$ and 1000 cc. benzene containing 1.5 g. methylethylpyridine, a blue solution containing 0.105 g./l. $CoCl_2$ is obtained.

100 g. butadiene are polymerized employing 900 cc. benzene containing 2 g. diethyl aluminum chloride, to which 100 cc. of the $CoCl_2$ solution (0.0105 g. $CoCl_2$) have been added.

The polymerization, carried out at 10–15° C., is completed within less than 2 hours. The dry polymer obtained amounts to 95 g. and, by infra-red examination, is shown to consist of 97.1% cis-1,4 structure, 1.4% trans-1,4 structure, and 1.5% 1,2 structure. The viscosimetric molecular weight is 595,000.

EXAMPLE 4

Using the same technique as described in Example 1, hexylamine is employed instead of pyridine. The benzene solution contains 0.110 g./l. $CoCl_2$ and 100 cc. are employed, together with 900 cc. benzene containing 2 g. diethyl aluminum chloride, to polymerize 100 g. butadiene. 95 g. dry polymer are obtained which, by infra-red analysis, shows the following composition:

| | Percent |
|---|---|
| Cis-1,4 structure | 95.7 |
| Trans-1,4 structure | 2.2 |
| 1,2 structure | 2.1 |

The viscosimetric molecular weight is 565,000.

EXAMPLE 5

A solution of pyrrole in benzene is used to prepare the $CoCl_2$ solution. The amounts are the same as used in Example 3.

With 1000 cc. benzene containing 0.0102 g. $CoCl_2$ complex and 2 g. diethyl aluminum chloride, 100 g. butadiene are polymerized, obtaining 97 g. dry polymer within about 3 hours. By infra-red examination the following composition is determined:

| | Percent |
|---|---|
| Cis-1,4 structure | 90.8 |
| Trans-1,4 structure | 6.6 |
| 1,2 structure | 2.6 |

The molecular weight is 620,000.

The polymerization is repeated using 150 g. butadiene instead of 100 g. The dry polymer amounts to 135 g. and its molecular weight is 835,000.

EXAMPLE 6

Morpholine is substituted for pyrrole in the preparation of the soluble cobalt complex. 100 g. butadiene are polymerized with a total 1000 cc. benzene containing 0.0125 g. $CoCl_2$ and 2 g. diethyl aluminum chloride. 94 g. polybutadiene containing 94.3% cis-1,4 structure are obtained. The molecular weight is 572,000.

EXAMPLE 7

The catalyst is prepared by contacting 100 cc. benzene containing 0.55 g. cobalt diethyl dithiocarbamate

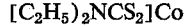

with 900 cc. benzene containing 4 g. diethyl aluminum chloride. With the solution thus obtained, 100 g. butadiene are polymerized to practically total conversion.

96 g. dry polymer are obtained, which by infrared examination, shows a 96.3% content of cis-1,4 structure.

EXAMPLE 8

The process is carried out as in Example 7, but using nickel diethyldithiocarbamate instead of the corresponding cobalt compound. 93 g. polymer with 92% cis-1,4 structure are obtained.

EXAMPLE 9

Using the technique described in Examples 7 and 8, the catalyst is prepared from 0.019 g. $Ni(CO)_4$.

50 g. butadiene are polymerized, obtaining 46 g. polymer with 91.5% cis-1,4 structure.

EXAMPLE 10

The catalyst is prepared using a complex soluble in n-heptane and benzene, consisting of $CoCl_2$ and $$O=P(OC_2H_5)_3$$

which is obtained by reacting 0.4 g. $CoCl_2$ with 0.56 g. triethyl phosphate in 100 cc. benzene. The filtered blue solution contains 0.015 g. $CoCl_2$ and is used with 900 cc. benzene containing 4 g. diethyl aluminum chloride, to form the catalyst.

100 g. butadiene are polymerized and the reaction is completed within about 2 hours, obtaining 92 g. dry polymer which, by infra-red examination, is shown to consist of 95.5% cis-1,4 structure, 2.7% trans-1,4 structure and 1.8% 1,2 structure.

The same run is repeated using 100 cc. of a $$CoCl_2/O-P(OC_2H_5)_3$$

solution in n-heptane and adding it to 4 g. diethyl aluminum chloride in 900 cc. benzene, obtaining also in this case a polybutadiene having a similar structure.

EXAMPLE 11

The run is carried out as in Example 10, but substituting triethyl phosphite $P(OC_2H_5)_3$ for triethylphosphate.

The polymer obtained is subjected to infra-red examination and shows a structure consisting of 91.5% cis-1,4, 5.5% trans-1,4 and 3% 1,2.

EXAMPLE 12

The run is carried out as described in Example 1, but diisobutyl aluminum monochloride is substituted for diethyl aluminum monochloride. 110 g. butadiene are polymerized, using 900 cc. benzene containing 6 g. diisobutyl aluminum chloride to which 100 cc. of a solution of the $CoCl_2$ pyridine complex (0.0083 g. $CoCl_2$) in benzene, have been added.

The polymerization, carried out at 10–15° C., is completed within less than 2 hours. The dry polymer amounts to 102 g., and, by infra-red examination, is shown to consist of 95.6% cis-1,4 structure, 1.8% trans-1,4 structure and 2.6% 1,2 structure.

EXAMPLE 13

0.2 g. $CoCl_2$ are reacted with 0.8 cc. acetonitrile dissolved in 200 cc. benzene while agitating for about 30 minutes. After filtration, a solution containing 0.5 g./liter $CoCl_2$ is obtained.

The catalyst is prepared by adding 10 cc. of a solution of the complex previously prepared, containing 0.005 g. $CoCl_2$, to 490 cc. benzene containing 4 g. $AlCl(C_2H_5)_2$.

The polymerization is carried out at 15–20° C. with 65 g. butadiene. The dry polymer thus obtained amounts to 48 g. and, by infra-red examination, is shown to have a content of 93% cis-1,4 structure, 4.2% trans-1,4 structure and 2.8% 1,2 structure.

EXAMPLE 14

A solution of $CoCl_2$ in benzene is prepared starting from 0.2 g. $CoCl_2$ and 1.2 cc. dimethylformamide dissolved in 200 cc. benzene. The solution, after filtration, contains 0.15 g./l. $CoCl_2$. For preparing the catalyst, 30 cc. of this solution (0.0045 g. $CoCl_2$) and 470 cc. benzene containing 4 g. diethyl aluminum chloride are used. The polymerization is carried out at a temperature of 15–20° C. using 55 g. butadiene.

The dry polymer obtained amounts to 40 g. and, by infra-red examination, is shown to have a content of 90.5% cis-1,4 structure, 6.1% trans-1,4 structure and 3.4% 1,2 structure.

EXAMPLE 15

A solution is prepared by reacting 0.02 mol $CoCl_2$ with 0.08 mol isopropyl alcohol, dissolved in 150 cc. benzene, while agitating for 1 hour. The blue solution after filtration contains 1.30 g./l. $CoCl_2$.

A soluble catalyst is prepared using 9 cc. of this solution (0.0117 g. $CoCl_2$) 6 g. diethyl aluminum chloride and 490 cc. benzene. 50 g. butadiene are polymerized within 4 hours with the aid of this catalyst.

49 g. dry polymer are obtained which, by infra-red examination, shows the following composition:

| | Percent |
|---|---|
| Cis-1,4 structure | 93.9 |
| Trans-1,4 structure | 2.5 |
| 1,2 structure | 3.6 |

EXAMPLE 16

By substituting technical heptane for benzene and operating under the same conditions and with the same quantities as in the preceding example, a solution containing 0.297 g./l. $CoCl_2$ is obtained.

The catalyst is prepared using 40 cc. of the $CoCl_2$ solution (0.0119 g. $CoCl_2$) and 10 g. diethyl aluminum chloride dissolved in a mixture of 400 cc. benzene and 60 cc. heptane. 50 g. butadiene are polymerized while the temperature is kept at 15° C.

41 g. dry polymer are obtained; the polymer has the following composition, as determined by infra-red examination:

| | Percent |
|---|---|
| Cis-1,4 structure | 93.7 |
| Trans-1,4 structure | 3.2 |
| 1,2 structure | 3.1 |

EXAMPLE 17

The $CoCl_2$ solution is prepared from 0.02 mol $CoCl_2$, 0.08 mol ethyl alcohol and 200 cc. benzene. The blue solution obtained after filtration contains 5.9 g./l. $CoCl_2$.

The catalyst is prepared from 2 cc. of said solution (0.0118 g. $CoCl_2$), 6 g. diethyl aluminum chloride, and 500 cc. benzene. 50 g. butadiene are polymerized at 15° C. in less than 2 hours, obtaining 48 g. dry polymer which, by infra-red examination, is shown to consist of 94.9% cis-1,4 structure, 2.9% trans-1,4 structure and 2.2% 1,2 structure.

EXAMPLE 18

Co-anilinium nitrite $(C_6H_5NH_3)_3[CO(NO_2)_6]$, which is soluble in both benzene and heptane, is used as the cobalt compound.

The catalyst is prepared by dissolving 0.079 g. Co-anilinium nitrite in 150 cc. benzene and adding this solution to 4.6 g. diethyl aluminum chloride dissolved in 350 cc. benzene. Operating at room temperature, 35 g. butadiene are introduced and the polymerization is carried out by agitating the mass for 30 minutes and then allowing it to stand. After 8 hours polymerization, 32 g. dry polymer are obtained which, by infra-red examination, is shown to have the following composition:

| | Percent |
|---|---|
| Cis-1,4 structure | 93.5 |
| Trans-1,4 structure | 2.6 |
| 1,2 structure | 3.9 |

EXAMPLE 19

A soluble complex is prepared using cobalt stearate which is treated with a solution of pyridine (5 g.) in 1000 cc. technical heptane. A pink solution, containing 0.38 g./l. Co is thus obtained. The catalyst is prepared using 10 cc. of said solution (0.0036 g. Co) which is added to 6 g. diethyl aluminum chloride dissolved in 490 cc. heptane. During preparation, the color of the solution turns from pink to light green and then to amber yellow while the formation of a precipitate is noted. 47 g. butadiene are polymerized while the temperature is kept at 15° C., for 3 hours, and 45 g. dry polymer are obtained, which, by infra-red examination, is shown to have the following composition:

| | Percent |
|---|---|
| Cis-1,4 structure | 94.2 |
| Trans-1,4 structure | 3.1 |
| 1,2 structure | 2.7 |

The molecular weight of the polymer is 39,000 [$\eta$]=0.72.

If, in the preparation of the catalyst the same amount of n-heptane solution of the cobalt stearate-pyridine complex is added to a solution of 6 g. diethyl aluminum chloride in 490 cc. of a mixture in equal proportions of n-heptane and benzene, a homogeneous, soluble catalyst is obtained.

Using this catalyst in the polymerization of the same amount of butadiene, 42 g. dry polymer are obtained. This polymer, while showing substantially the same structure, presents however a much higher molecular weight (approximately 320,000).

Similar results are obtained when employing other VIII group metal compounds.

EXAMPLE 20

Using 0.46 g. nickel xanthogenate and 100 cc. benzene, a solution is prepared and agitated for 30 minutes. The solution, after filtration, contains 0.0226 g./l. Ni. The catalysts is prepared employing 100 cc. of said solution (0.00226 g. Ni) and 12 g. diethyl aluminum chloride in 400 cc. benzene. 100 g. butadiene are polymerized at 15° C. obtaining 20 g. dry polymer which, by infra-red examination, is shown to have the following composition:

| | Percent |
|---|---|
| Cis-1,4 structure | 93.5 |
| Trans-1,4 structure | 3.5 |
| 1,2 structure | 3.0 |

EXAMPLE 21

A solution is prepared starting from $CoCl_2$ which is dissolved in benzene containing triethylphosphine.

0.13 g. $CoCl_2$ are employed, which are dissolved in 1000 cc. benzene containing 0.25 g. triethylphosphine.

The catalyst is prepared by adding 50 cc. of the aforementioned solution to 2 g. diethyl aluminum chloride dissolved in 450 cc. benzene. 49 g. butadiene are polymerized at 15° C. for 4 hours obtaining 46 g. polymer which, by infrared examination, is shown to have the following composition:

| | Percent |
|---|---|
| Cis-1,4 structure | 95.2 |
| Trans-1,4 structure | 2.7 |
| 1,2 structure | 2.1 |

EXAMPLE 22

A $CoCl_2$ solution in benzene is prepared by using trimethylamine as the complex-forming agent. Starting from 0.1 g. $CoCl_2$, 0.033 g. trimethylamine and 150 cc. benzene, a solution containing 0.06 g./l. $CoCl_2$ is obtained which, when added to 4.6 g. diethyl aluminum chloride dissolved in 350 cc. benzene, forms the catalyst.

90 g. butadiene are polymerized, obtaining 61 g. dry polymer. The infra-red spectra show the following structure:

| | Percent |
|---|---|
| Cis-1,4 structure | 87.5 |
| Trans-1,4 structure | 4.8 |
| 1,2 structure | 7.7 |

EXAMPLE 23

The catalyst is prepared employing 0.0025 mol trivalent cobalt acetylacetonate dissolved in 500 cc. benzene and 0.05 mol diethyl aluminum chloride dissolved in further 500 cc. benzene. 150 g. butadiene are polymerized at 20° C., thus obtaining more than 90 g. dry polymer having a rubbery appearance.

The infra-red spectra show the following structure:

| | Percent |
|---|---|
| Cis-1,4 | 65.1 |
| Trans-1,4 | 9.0 |
| 1,2 | 25.9 |

EXAMPLE 24

A soluble cobalt complex is prepared by reacting 0.1 g. $CoCl_2$ and 0.2 g. phenylhydrazine in 150 cc. benzene. The solution, after filtration, contains 0.00174 g. $CoCl_2$ and is used as such for preparing the catalyst by adding it to 12 g. diethyl aluminum chloride dissolved in 350 cc. benzene.

60 g. butadiene are polymerized while keeping the temperature at 15–20° C. The dry polymer obtained shows the following structure, by infra-red examination:

| | Percent |
|---|---|
| Cis-1,4 | 78.8 |
| Trans-1,4 | 3.1 |
| 1,2 | 18.1 |

EXAMPLE 25

Commercial rubber-grade butadiene is polymerized with the aid of a soluble catalyst prepared as follows: into a flask provided with a stirrer, 2 g. anhydrous $CoCl_2$ in 1000 cc. benzene are introduced, 1.23 cc. pyridine are added and the mixture is stirred for 30 minutes. The benzene acquires a deep blue color. A solid consisting of the $CoCl_2$ pyridine complex which is only scarcely soluble in benzene remains in the flask. This solid complex is separated by filtration from the blue benzene solution which assays 0.1 g./l. of dissolved $CoCl_2$. 50 cc. of the benzene solution of the $CoCl_2$-pyridine complex (containing 0.000375 mol $CoCl_2$) are diluted with 200 cc. benzene and added to 0.0172 mol $Al(C_2H_5)_2Cl$ dissolved in 250 cc. benzene..

The addition is made in a flask, provided with a stirrer, and over a period of 10 minutes.

The catalyst thus prepared is introduced, under an inert gas, into an autoclave, and 100 g. rubber grade butadiene are added. The polymerization is carried out at 15° C. When the polymerization is completed, the polymer formed is precipitated with methanol in the presence of an antioxidant and is dried under vacuum.

80 g. of an elastic, rubbery product which, by infra-red examination reveals the following composition, are obtained.

| | Percent |
|---|---|
| Cis-1,4 | 95 |
| Trans-1,4 | 2.5 |
| 1,2 | 2.5 |

If a mixture of 95% rubber-grade butadiene and 5% isobutene is polymerized with the same catalyst under the same conditions at 15° C., the rubbery elastic polymer obtained shows the following structure by infra-red examination.

| | Percent |
|---|---|
| Cis-1,4 | 96.9 |
| Trans-1,4 | 1.7 |
| 1,2 | 1.4 |

EXAMPLE 26

With the same modalities and the same amounts of catalyst as in Example 25, mixtures containing variable amounts of butadiene, isobutene, and butene-1 are polymerized. In all cases elastic rubbery polymers which, by infra-red examination, show the following structures have been obtained.

| Composition of the starting mixtures (percent by weight) | | | Composition of the polymers (by infra-red examination) | | |
|---|---|---|---|---|---|
| Butadiene | Isobutene | Butene | Cis, percent | Trans, percent | 1.2 percent |
| 90 | ---- | 10 | 95.3 | 2.0 | 2.6 |
| 75 | ---- | 25 | 96.2 | 2.6 | 2.1 |
| 50 | 10 | 40 | 96.5 | 2.4 | 2.8 |
| 50 | 25 | 25 | 96.7 | 1.2 | 2.0 |
| 30 | 30 | 40 | 96.6 | 1.3 | 2.1 |

It is to be noted that butene-1 does not polymerize with the aid of the soluble cobalt catalyst used and can therefore be recovered as a gas at the end of the polymerization. Isobutene gives a mixture (which represents 5–10% of the starting isobutene) consisting of 80% diisobutene, and 20% triisobutene, the remainder being recovered together with butene.

EXAMPLE 27

With the catalyst and the modalities given in Example 25 a $C_4$ fraction of petroleum cracking gases, having the following composition by weight, is polymerized.

| | Percent |
|---|---|
| Ethylene | 0.2 |
| Propylene | 3.6 |
| Isobutane | 1.7 |
| Butane | 4.2 |
| Isobutene | 34.7 |
| Trans-2-butene | 7.8 |
| Cis-2-butene | 3.7 |
| Butene-1 | 28.3 |
| Butadiene | 15.8 |

The polybutadiene obtained shows the following structure, by infra-red examination.

| | Percent |
|---|---|
| Cis-1,4 | 96.5 |
| Trans-1,4 | 1.0 |
| 1,2 | 2.5 |

EXAMPLE 28

A $C_4$ cracking stream of the following composition is polymerized.

| | Percent |
|---|---|
| Butadiene | 32.4 |
| n-Butane | 11.6 |
| Isobutene+1-butene | 24 |
| 2-butene | 32 |

The catalyst is prepared by dissolving in 1000 cc. benzene 0.1376 g. cobalt stearate and an amount of pyridine such as to have a cobalt/pyridine molar ratio of 2. The solution is added to a solution of 18.6 g. aluminum diethyl monochloride in 595 cc. benzene.

To the catalyst solution thus obtained 2640 cc. of the above $C_4$ hydrocarbon mixture are added and polymerization is carried out at −5° C.

After 20 hours, the reaction is stopped by addition of 50 cc. methanol.

From the autoclave, a very viscous solution is discharged from which, by addition of more methanol, separation and drying, 450 g. polymer are obtained, which by infra-red analysis are shown to consist of 96.5% of cis-1,4 polybutadiene. The intrinsic viscosity of the polymer, in toluene at 26° C., is 3.72.

EXAMPLE 29

A cobalt naphthenate catalyst is employed in the polymerization of the $C_4$ hydrocarbon mixture of the previous example.

The catalyst is prepared by mixing a benzene solution of, respectively, 0.00018 mol cobalt naphthenate and 0.0154 mol aluminum diethyl monochloride. 1860 cc. benzene are employed in total.

2584 cc. of a $C_4$ hydrocarbon mixture, containing 29.2% butadiene (490 g.) are employed.

In 5½ hours at 5° C., 440 g. dry polymer are obtained. The polymer shows a 93.7% content of cis-1,4 structure and an intrinsic viscosity of 3.16.

The foregoing examples clearly demonstrate the effectiveness of a wide variety of different complexing agents in rendering the Group VIII metal halides soluble in the hydrocarbons used as the polymerization medium, and the effectiveness of the homogeneous stereospecific catalysts obtained by mixing the soluble complexes with the organometallic compounds, in polymerizing the diolefins to high polymers consisting prevailingly of macromolecules having substantially the cis-1,4 structure. It will be apparent that variations in details may be made in practicing the invention without departing from the spirit thereof and therefore we intend to include in the scope of the appended claims all such changes and modifications as may be apparent to those skilled in the art from the description and specific examples given herein.

What is claimed is:

1. A process for the production of a homogeneous stereospecific catalyst which polymerizes butadiene to polybutadiene consisting of macromolecules in which substantially all of the units derived from the monomer have cis-1,4 enchainment, which comprises mixing (1) a dialkyl aluminum monohalide in which the alkyl groups contain from 1 to 5 carbon atoms, with (2) a solution, in a solvent selected from the group consisting of normally liquid cycloaliphatic hydrocarbons, non-halogenated aromatic hydrocarbons, chlorinated aromatic hydrocarbons, mixtures of said solvents with each other, and mixtures of said solvents with controlled amounts of normally liquid aliphatic hydrocarbons, of a cobalt compound which is a soluble complex of a normally insoluble salt of cobalt, with a complexing agent selected from the group consisting of pyridine, methylpyridine, hexylamine, pyrrole, morpholine, triethylphosphate, triethylphosphite, acetonitrile, dimethylformamide, triethylphosphine, trimethylamine, and phenyl hydrazine, the amount of the cobalt compound in the solution being from about 0.01 to about 0.4 millimol per liter the amount of the complexing agent being sufficient to render the normally insoluble cobat salt completely soluble in the selected solvent, and the amount of dialkyl aluminum monohalide in the solution being from about 10 to about 20 millimols per liter.

2. The process according to claim 1, characterized in that (2) is a solution of the selected cobalt compound in a normally liquid cycloaliphatic hydrocarbon.

3. The process according to claim 1, characterized in that (2) is a solution of the selected cobalt compound in a normally liquid aromatic hydrocarbon.

4. The process according to claim 1, characterized in that (2) is a solution of the selected cobalt compound in a normally liquid chlorinated aromatic hydrocarbon.

5. The process according to claim 1, characterized in that (2) is a solution of the selected cobalt compound in a mixture of a solvent selected from the group consisting of cyclo-aliphatic hydrocarbons, non-halogenated aromatic hydocarbons, and chlorinated aromatic hydrocarbons with an amount of a normally liquid aliphatic hydrocarbon insufficient to cause precipitation of solid catalyst components.

6. The process according to claim 1, characterized in that the cobalt compound is a soluble complex of cobaltous choride, with pyridine.

7. The process according to claim 1, characterized in that the dialkyl aluminum monochloride is diethyl aluminum monochloride.

8. A catalyst prepared by the process of claim 1.

9. A process for the stereospecific polymerization of butadiene to polybutadiene made up of macromolecules in which substantially all of the units derived from the monomer have cis-1,4 enchainment and which has a molecular weight distribution in a narrow range, which comprises contacting butadiene, under polymerization conditions and at a temperature of from 5° to 25° C. with a homogeneous stereospecific catalyst prepared by mixing (1) a dialkyl aluminum monohalide in which the alkyl groups contain from 1 to 5 carbon atoms, with (2) a solution, in a solvent selected from the group consisting of normally liquid cycloaliphatic hydrocarbons, non-halogenated aromatic hydrocarbons, chlorinated aromatic hydrocarbons, mixtures of said solvents with each other, and mixtures of said solvents with controlled amounts of normally liquid aliphatic hydrocarbons, of a cobalt compound which is soluble complex of a normally insoluble salt of cobalt with a complexing agent selected from the group consisting of pyridine, methylpyridine, hexylamine, pyrrole, morpholine, triethyl phosphate, triethylphosphite, acetonitrile, dimethylformamide, triethyl phosphine, trimethylamine, and phenyl hydrazine, the amount of the cobalt compound in the solution being from 0.01 to about 0.09 millimole per liter, the amount of the complexing agents being sufficient to render the normally insoluble cobalt salt completely soluble in the selected solvent, and the amount of dialkyl aluminum monohalide in the solution being from about 10 to about 20 millimoles per liter; and recovering the solid polymerizate thus produced.

10. The process according to claim 9, characterized in that the butadiene is contacted under polymerization conditions and at a temperature of from about 5° C. to 25° C., with a homogeneous stereospecific catalyst prepared by mixing (1) a dialkyl aluminum monohalide in which the alkyl groups contain from 1 to 5 carbon atoms, with (2) solution of the complex of the normally insoluble salt of cobalt with the complexing agent in a normally liquid cycloaliphatic hydrocarbon.

11. The process according to claim 9, characterized in that the butadiene is contacted, under polymerizing conditions and at a temperature of from 5° C. to 25° C., with a homogeneous stereospecific catalyst prepared by mixing (1) a dialkyl aluminum monohalide in which the alkyl groups contain from 1 to 5 carbon atoms, with (2) a solution of the complex of the normally insoluble salt of cobalt with the complexing agent, in a normally liquid aromatic hydrocarbon.

12. The process according to claim 9, characterized in that the butadiene is contacted, under polymerization conditions and at a temperature of from 5° C. to 25° C., with a homogeneous stereospecific catalyst prepared by mixing (1) a dialkyl aluminum monohalide in which the alkyl groups contain from 1 to 5 carbon atoms, with (2) a solution of the complex of the normally insoluble salt of cobalt with the complexing agent, in a normally liquid chlorinated aromatic hydrocarbon.

13. The process according to claim 9, characterized in that the butadiene is contacted, under polymerization conditions and at a temperature of from 5° C. to 25° C., with a homogeneous stereospecific catalyst prepared by mixing (1) a dialkyl aluminum monohalide in which the alkyl groups contain from 1 to 5 carbon atoms, with (2) a solution of the complex of the normally insoluble salt of cobalt with the complexing agent, in a mixture of solvents selected from the group consisting of cycloaliphatic hydrocarbons, non-halogenated aromatic hydrocarbons, and chlorinated aromatic hydrocarbons.

14. The process according to claim 9, characterized in that the butadiene is contacted, under polymerization conditions and at a temperature of from 5° C. to 25° C., with a homogeneous stereospecific catalyst prepared by mixing (1) a dialkyl aluminum monohalide in which the alkyl groups contain from 1 to 5 carbon atoms, with (2) a solution of the complex of the normally insoluble salt of cobalt with the complexing agent in a mixture of solvents selected from the group consisting of normally liquid cycloaliphatic hydrocarbons, non-halogenated aromatic hydrocarbons and chlorinated aromatic hydrocarbons, with controlled amounts of normally liquid aliphatic hydrocarbons.

References Cited

UNITED STATES PATENTS

| 2,832,759 | 4/1958 | Nowlin et al. | 260—94.3 |
| 2,881,156 | 4/1959 | Pilar et al. | 260—94.3 |
| 2,905,659 | 9/1959 | Miller et al. | 260—94.3 |
| 2,953,556 | 9/1960 | Wolfe | 260—94.7 |
| 2,956,991 | 10/1960 | Coo | 260—94.3 |
| 2,977,349 | 3/1961 | Brockway | 260—94.3 |
| 3,094,514 | 6/1963 | Tucker | 260—94.3 |
| 3,135,725 | 6/1964 | Carlson et al. | 260—94.3 |
| 3,065,220 | 11/1962 | McManimie et al. | 260—94.3 |
| 3,139,418 | 6/1964 | Marullo et al. | 260—94.3 |

FOREIGN PATENTS

| 785,314 | 10/1957 | Great Britain. |
| 534,792 | 1/1955 | Belgium. |
| 543,292 | 6/1956 | Belgium. |
| 554,242 | 5/1957 | Belgium. |

OTHER REFERENCES

Gippin, I & EC Product Research & Development, vol. 1, #1, March 1962. Pages 32–39 relied on.

JOSEPH L. SCHOFER, Primary Examiner

R. A. GAITHER, Assistant Examiner

U.S. Cl. X.R.

252—429